(12) United States Patent
Altenburg et al.

(10) Patent No.: US 7,707,350 B2
(45) Date of Patent: Apr. 27, 2010

(54) BUS INTERCONNECT SWITCHING MECHANISM

(75) Inventors: Michael E. Altenburg, Beaverton, OR (US); Binta M. Patel, Round Rock, TX (US); Lance Hacking, Austin, TX (US); David K. Dean, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 12/057,796

(22) Filed: Mar. 28, 2008

(65) Prior Publication Data
US 2009/0248936 A1 Oct. 1, 2009

(51) Int. Cl.
*G06F 13/36* (2006.01)
(52) U.S. Cl. .................. 710/317; 710/316
(58) Field of Classification Search ......... 710/306–317, 710/104–107
See application file for complete search history.

(56) References Cited

U.S. PATENT DOCUMENTS

| | | | | |
|---|---|---|---|---|
| 5,692,137 A | * | 11/1997 | Regal et al. | 710/310 |
| 5,893,145 A | * | 4/1999 | Thayer et al. | 711/125 |
| 6,990,539 B2 | * | 1/2006 | La Fetra et al. | 710/107 |
| 2007/0245061 A1 | * | 10/2007 | Harriman | 711/100 |

* cited by examiner

*Primary Examiner*—Raymond N Phan
(74) *Attorney, Agent, or Firm*—Carrie Boone; Carrie A. Boone, P.C.

(57) ABSTRACT

A front side bus swizzle mechanism modifies the front side (address and data) bus on a chip so that, when the chip is positioned on one side of a printed circuit board, connection to a second chip located on the opposite side of the printed circuit board is simplified. The simplified connection may result in less complexity and minimize the consumption of additional printed circuit board real estate.

9 Claims, 7 Drawing Sheets

BUS INTERCONNECT SWITCHING MECHANISM

TECHNICAL FIELD

This application relates to connections between chips on a printed circuit board and.

BACKGROUND

When two chips to be connected together are placed on the same side of a printed circuit board (PCB), the chips may readily be positioned such that interconnect buses on each chip line up adjacent to one another. In such a configuration, connection between the bus of the first chip and the bus of the second chip is trivial.

However, when the two chips are placed on opposite sides of the PCB, the interconnect buses may not line up. Further, sometimes the two chips are positioned on the same side of the PCB, yet their interconnect buses do not line up. Forming a connection between chips positioned in this manner may be achieved by crossing the connectors, such as in an "X" configuration. The crisscrossing of the bus lines adds complexity to the routing, may consume additional real estate, and may possibly consume additional layers on the PCB.

Thus, there is a continuing need for a connection mechanism that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a chip interconnect swizzle mechanism is disclosed. The chip interconnect swizzle mechanism modifies the interconnect bus on a chip so that connection to a second chip, wherever the chips are located, is simplified. The simplified connection may result in less complexity and minimize the consumption of additional printed circuit board real estate.

In the following detailed description, reference is made to the accompanying drawings, which show by way of illustration specific embodiments in which the chip interconnect swizzle mechanism may be practiced. However, it is to be understood that other embodiments will become apparent to those of ordinary skill in the art upon reading this disclosure. For example, the drawings show a central processing unit (CPU) and a chipset being interconnected. However, the principles described herein may be applied to a number of different chip components, and is not intended to be limited to the examples given. The following detailed description is, therefore, not to be construed in a limiting sense, as the scope of the front side bus swizzle mechanism is defined by the claims.

Figure 1:
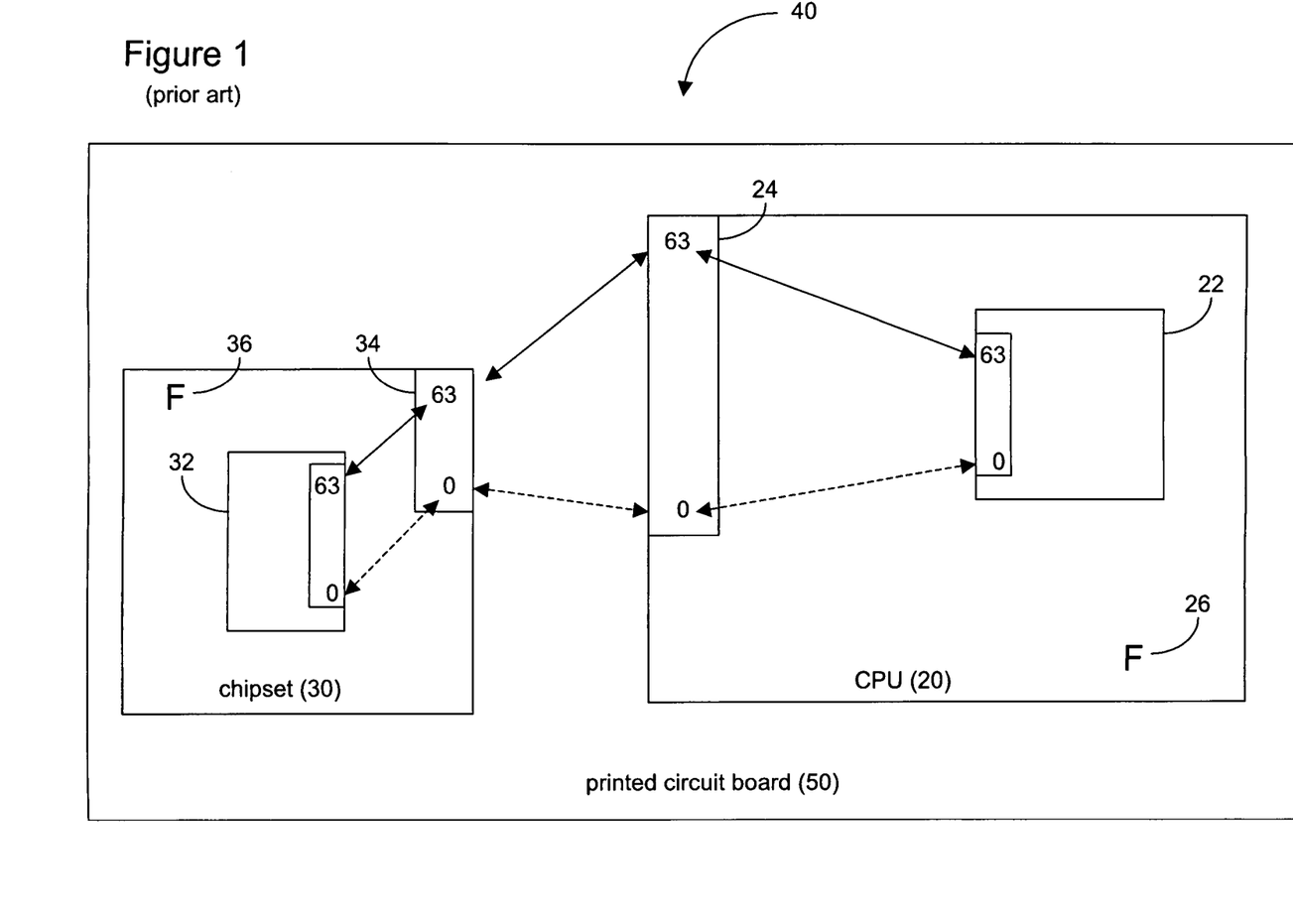
FIG. 1 is a schematic diagram of a system in which two interconnecting chips occupy a single side of a printed circuit board, according to the prior art.

FIG. 1 is a schematic diagram of a system 40 including a printed circuit board (PCB) 50 with two chips to be interconnected, according to the prior art. Populating the PCB 50 are a central processing unit (CPU) 20 and a chipset 30. The chipset 30 may be a multi-function chipset, such as a graphics and memory controller hub. The CPU 20 includes a core 22 and an interconnect bus 24; likewise, the chipset 30 includes a core 32 and an interconnect bus 34. The buses 24, 34 are shown to have sixty-four signal lines, although any number of signal lines may be present, as long as the bus 24 has the same number as the bus 34. The CPU 20 is marked with an orientation stamp, "F" 26, on the top of the package and is used to indicate the orientation of each chip. The chipset 30 is likewise marked with a "F" 36. The orientation stamps 26, 36 are used to make the orientations clear in later descriptions.

Figure 2:
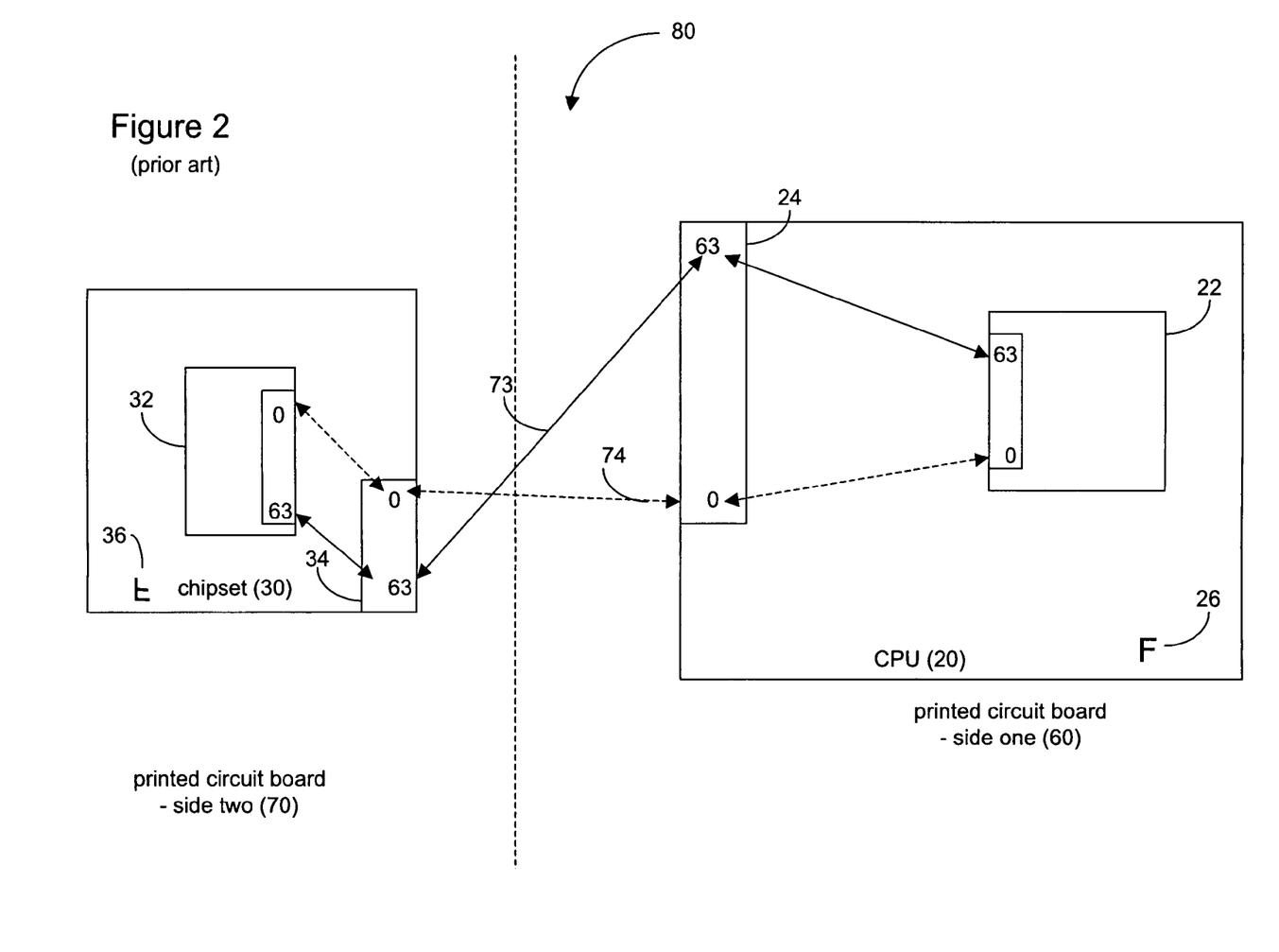
FIG. 2 is a schematic diagram of a system in which two interconnecting chips occupy opposite sides of a printed circuit board, according to the prior art.

Arrows depict the interconnection between the CPU 20 and the chipset 30, with the dashed lines denoting the least significant bit of the bus and the solid lines denoting the most significant bit of the bus. For connecting the interconnect buses 24, 34, interconnect signal (IS) 0 24 of the CPU 20 is connected to interconnect signal 0 34 of the chipset 30; IS 1 24 is connected to IS 1 34; IS 2 24 is connected to IS 2 34; . . . ; and IS 63 24 is connected to IS 63 34. Since the CPU 20 and the chipset 30 occupy the same side of the PCB 50, it is possible to position the two chips so as to minimize connection complexity and consumption of the PCB real estate.

Where the chips do not occupy the same side of the PCB, their interconnection may become more complex. In FIG. 2, for example, a system 80 including a two-sided PCB is schematically depicted, according to the prior art. This time, the CPU 20 occupies a first side 60 of the PCB while the chipset 30 occupies a second side 70 (the opposite side) of the PCB. The orientation stamp 36 on the chipset 30 illustrates that the view is now through the PCB 50, looking at the bottom of the chipset. In order to connect the interconnect buses 24, 34, a criss-cross is made between connecting lines 72 and 74 (as well as intermediate connecting lines not shown). Otherwise, the interconnect signals are connected as in FIG. 1 (IS 0 24 is connected to IS 0 34; . . . ; IS 63 24 is connected to IS 63 34), but, again, the criss-crossing of connecting lines 72, 74 (and other connecting lines) adds complexity to the system. Further, the connection complexity may cause system designers to utilize more real estate to successfully connect the CPU 20 to the chipset 30.

Figure 3:
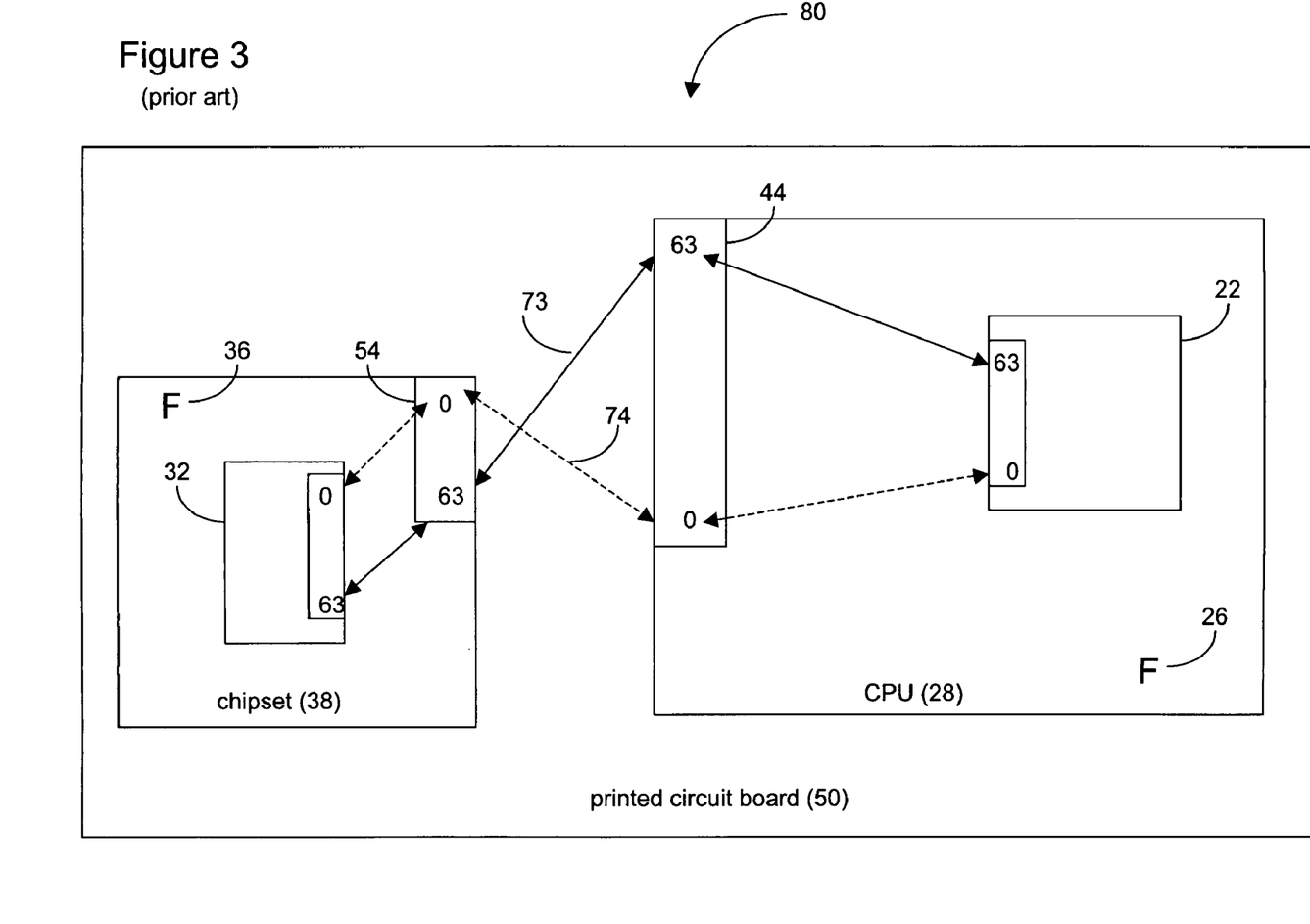
FIG. 3 is a schematic diagram of a system in which two interconnecting chips occupy a single side of a printed circuit board, yet interconnection between the chips is non-trivial, according to the prior art.

FIG. 3 depicts yet another configuration between a CPU 28 and a chipset 38, with a schematic diagram of a system 80, according to the prior art. In the system 80, the CPU 28 and chipset 38 occupy the same side of the PCB 50. However, the interconnect 44 on the CPU 28 does not "match" the interconnect 54 on the chipset 38. In other words, the placement of the pins on the CPU 28 does not match the placement of pins on the chipset 38, causing connecting lines 72, 74 (and other connecting lines) to criss-cross. In some embodiments, such criss-crossing adds complexity and cost to the design.

In the configurations of FIGS. 2 and 3, the group of signals between the CPU and chipset are aligned such that they must cross over one another within the PCB to successfully connect to one another.

Figure 4:
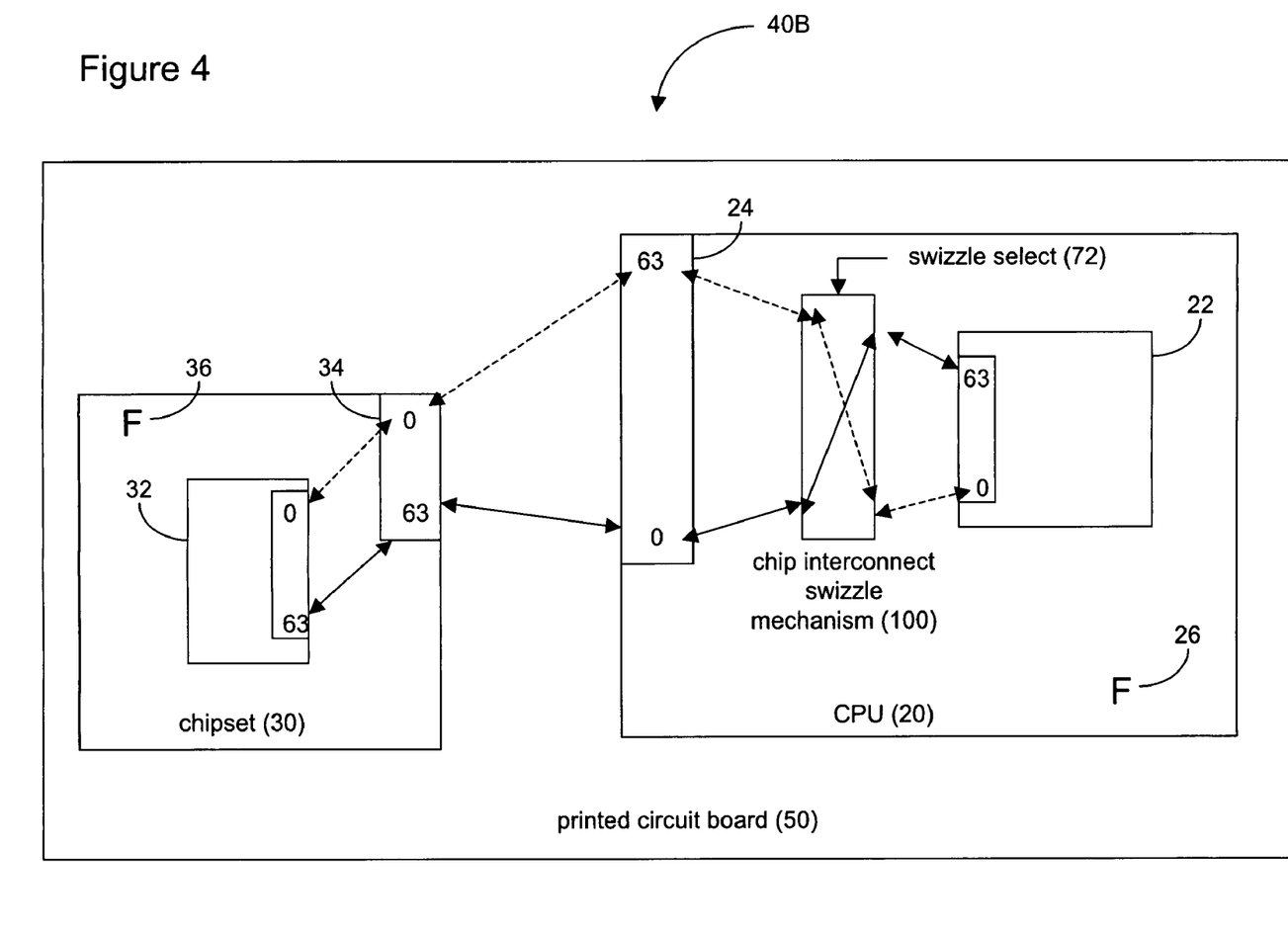
FIG. 4 is a block diagram of a chip interconnect swizzle mechanism with the swizzle select enabled, according to some embodiments.
Figure 5:
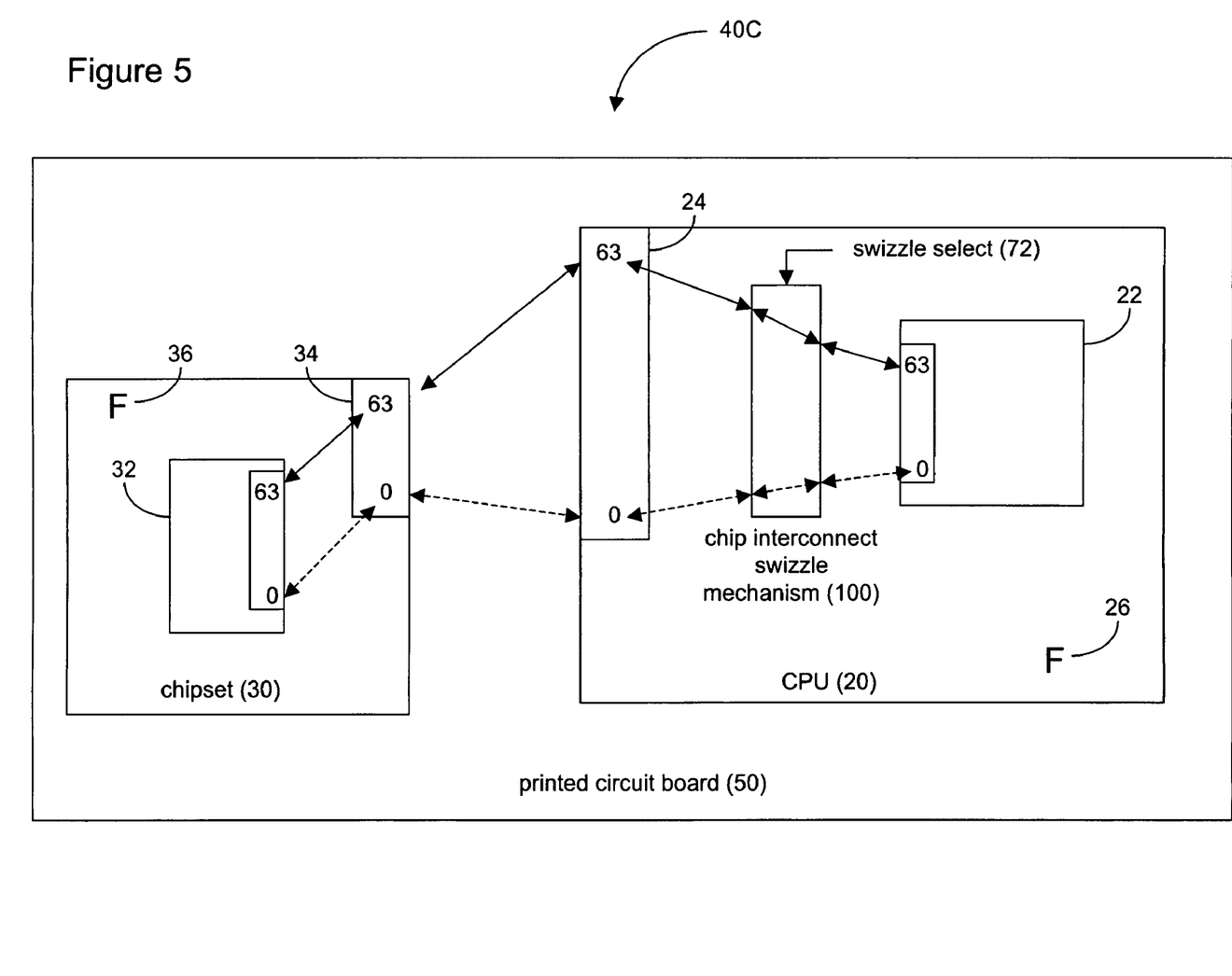
FIG. 5 is a block diagram of the chip interconnect swizzle mechanism of FIG. 4 with the swizzle select disabled, according to some embodiments.

FIGS. 4 and 5 schematically illustrates a chip interconnect swizzle mechanism 100, according to some embodiments, to swizzle one or more buses of a chip. In FIGS. 4 and 5, the system 40 of FIG. 1 is replaced with systems 40B and 40C, respectively, each of which now include the swizzle mechanism 100. In FIG. 4, the one or more buses of the central processing unit (CPU) 20 are swizzled (swizzle ON) while, in FIG. 5, the one or more buses are not swizzled (swizzle OFF). As used herein, the term "swizzle" in the context of a bus refers to switching the signal connectors of the bus such that the low-numbered connectors occupy positions formerly occupied by high-numbered connectors and the high-numbered connectors occupy positions formerly occupied by low-numbered connectors.

The chip interconnect swizzle mechanism 100 can be configured to pass through the physical interconnect signals from interconnect 24 to the CPU core 22 (swizzle OFF). Accordingly, the swizzle mechanism 100 may include a number of individual circuits, forming an array of circuits. The swizzle mechanism 100 may also be configured to swizzle the physical signals so that physical pin zero on interconnect 24 is routed to pin 63 on the CPU core 22 instead of pin zero on the CPU core. This extends with the CPU core 22 bit one getting either physical bit one or physical bit 62 from interface 24, CPU core 22 bit 2 getting either physical bit two or physical bit 61 from interface 24 etc. This allows the criss-cross that would have occurred between interface 34 on the chipset 30 and interface 24 on the CPU 20 to instead occur within the CPU 20. The chip interconnect swizzle mechanism 100 thus removes the added printed circuit board complexity area, and possible layers of doing the criss-cross through the PCB.

According to some embodiments, the swizzling behavior of the chip interconnect swizzle mechanism 100 is enabled using a swizzle select signal 72. The swizzle select signal 72 may be generated from various places, such as an input to the CPU 20 or an internal setting within CPU 20, for example, a fuse or a control register. Enablement of the swizzle mechanism 100, in a similar fashion, also addresses the case where the chipset is mounted to the opposite side of the motherboard by engaging the swizzling internal to the CPU rather than through the PCB. Using the chip interconnect swizzle mechanism 100, the bus of the CPU 20 may be swizzled so that the buses line up nicely, no matter the placement of the components on the PCB 50.

In FIG. 5, the system 40C operates in the swizzle OFF state. In this configuration, the swizzle select 72 is inactive, causing physical pins 0 . . . 63 on the interconnect 24 to pass through to pins 0 . . . 63 of the CPU core 22.

Figure 6:
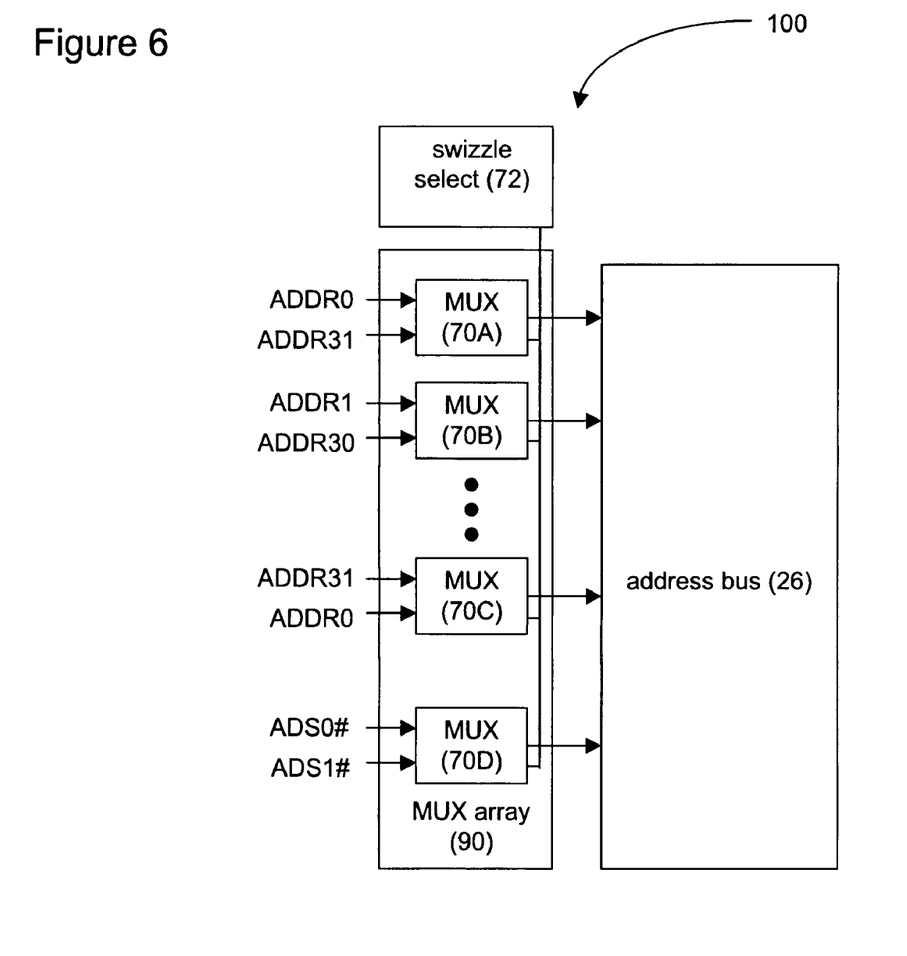
FIG. 6 is a block diagram of the chip interconnect swizzle mechanism of FIGS. 4 and 5, including a MUX array, according to some embodiments.

FIG. 6 shows the operation of the chip interconnect swizzle mechanism 100 using a MUX array 90, according to some embodiments. For illustration, a 32-bit address bus 26 is used, with each address signal being designated as ADDR0, . . . , ADDR31. The MUX array 90 includes a series of multiplexers, MUX 70A, 70B, . . . , 700 (collectively, MUXes 70), one for each address signal on the address bus. Address signals ADDR0 and ADDR31, at opposite ends of the bus, are fed as input into the first MUX; address signals ADDR1 and ADDR30 are fed as input into the second MUX; address signals ADDR2 and ADDR29 are fed as input into the third MUX; and so on, until the final MUX in the MUX array 90, receives address signals ADDR1 and ADDR 31 (the same signals as for first MUX, except from different interconnects). Each MUX 70 in the MUX array 90 receives a unique combination of two signals from the two interconnects. A swizzle select 72 controls which of the two input signals is selected as an output for each MUX 70. The swizzle select 72 either selects all MUXes 70 in the MUX array 90 or deselects all MUXes. After swizzling, the two chips' interconnects may be engaged with one another without having any crossed signal connections.

To generalize, for two buses having n signals 0 to n–1, the MUX array 90 of the chip interconnect swizzle mechanism 100 includes n MUXes for performing non-strobe signal swizzling. The first MUX takes the $0^{th}$ signal of the first bus and the $(n-1)^{th}$ signal of the second bus as inputs; the second MUX takes the $1^{st}$ signal of the first bus and the $(n-2)^{th}$ signal of the second bus as inputs; . . . ; the $(n-1)^{th}$ MUX takes the $(n-2)^{th}$ signal of the first bus and the $1^{st}$ signal of the second bus as inputs; and the $n^{th}$ MUX takes the $(n-1)^{th}$ signal of the first bus and the $0^{th}$ signal of the second bus as inputs.

Figure 7:
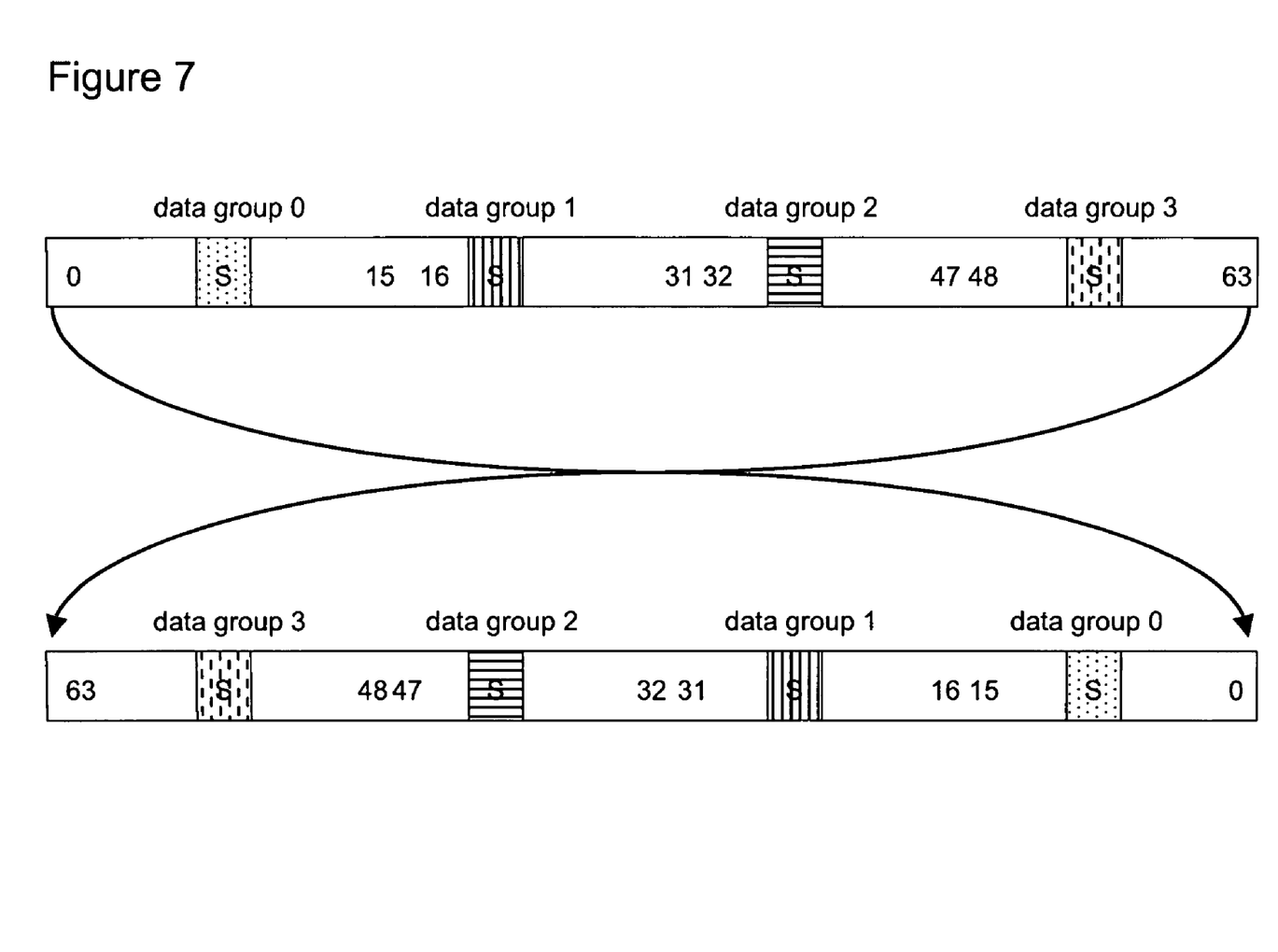
FIG. 7 is a block diagram showing how the data bus is swizzled using the chip interconnect swizzle mechanism of FIG. 4, according to some embodiments.

In addition to the connection lines being swapped, signal for signal, the chip interconnect swizzle mechanism 100 ensures that strobes are swapped, so that they remain with their corresponding data group. This feature is further illustrated in FIG. 7, in an example where two 63-bit data buses are to be connected. In some embodiments, data strobe lines are swapped as follows:

DSTB[0]/DSTB[0]#<<-->>DSTB[3]/DSTB[3]#

DSTB[1]/DSTB[1]#<<-->>DSTB[2]/DSTB[2]#

Thus, the MUX array 90 includes additional MUXes 70 for swizzling the strobe signals of the interconnect, strobe MUXes or data strobe MUXes. Where the two chips have address buses, the address strobe lines may be swapped as follows:

ADS[0]#<<-->>ADS[1]#

The address strobes are shown in FIG. 5 as inputs to the MUX 70D, an address strobe MUX. Where the interconnect has an odd number of strobe lines, the middle strobe line will not be swapped, in some embodiments.

The chip interconnect swizzle mechanism 100 may be extended to other large parallel busses. The mechanism 100 is capable of swizzling more than one bus, as shown in FIGS. 4 and 5. In some embodiments, the chip interconnect swizzle mechanism 100 is advantageous because it simplifies connecting the bus on the printed circuit board. If every one of the bus signals (which may include more than one hundred signals) line up, this substantially simplifies connection of the two chips. Additionally, printed circuit board designers may make the bus very compact to consume as little real-estate as possible, thus saving cost.

The chipset interconnect swizzling mechanism 100 is novel in that the swizzling may be implemented on a very large parallel bus that operates at extremely fast frequencies and must comply with stringent signal integrity requirements.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A swizzling mechanism, comprising:
   a circuit array comprising a plurality of multiplexer circuits, each multiplexer circuit to receive two signals from an interconnect having n signals, the interconnect and the circuit array residing on a first chip, the interconnect to be coupled to a second interconnect of a second chip, the first and second chips being disposed on a printed circuit board, each interconnect having n signals, denoted as $0^{th}$, $1^{st}$, $2^{nd}$, ..., and $(n-1)^{th}$, signals, wherein a first multiplexer circuit of the circuit array receives the $0^{th}$ signal as its first input and the $(n-1)^{th}$ signal as its second input, a second multiplexer circuit of the circuit array receives the $1^{st}$ signal as its first input and the $(n-2)^{th}$ signal as its second input, and so on; and a select signal coupled to each multiplexer circuit, wherein the select signal, when activated, causes each multiplexer circuit of the circuit array to send its second input as its output.

2. The swizzling mechanism of claim 1, wherein the number of multiplexer circuits is equivalent to the number of signals in each interconnect.

3. The swizzling mechanism of claim 1, wherein the first chip interconnect and the second chip interconnect are coupled without crossed signal connections.

4. The swizzling mechanism of claim 1, wherein n is an odd number and the $((n-1)/2+1)^{th}$ signal is not fed into a multiplexer circuit.

5. The swizzling mechanism of claim 1, wherein the first chip and the second chip are disposed on the same side of the printed circuit board.

6. The swizzling mechanism of claim 1, wherein the first chip is disposed on a first side of the printed circuit board and the second chip is disposed on a second side of the printed circuit board.

7. A system, comprising:
   a first chip comprising a first interconnect bus comprising n first signals, wherein n is an even integer number;
   a second chip comprising a second interconnect bus comprising n second signals;
   a swizzle mechanism comprising:
      a multiplexer array, each multiplexer of the multiplexer array to receive two of the first signals, the multiplexer array comprising:
         a first multiplexer to receive a $1^{st}$ signal of the n first signals as a first input and an $n^{th}$ signal of the n first signals as a second input;
         a second multiplexer to receive a $2^{nd}$ signal of the n first signals as a first input and an $(n-1)^{th}$ signal of the n first signals as a second input;
         ...; and
         a last multiplexer to receive a $(n/2)^{th}$ signal of the n first signals as a first input and an $(n/2+1)^{th}$ signal of the n first signals as a second input; and
      a swizzle select coupled to each multiplexer in the multiplexer array, the swizzle select to control the output of each multiplexer;
   wherein the swizzle select either selects all multiplexers in the multiplexer array or deselects all multiplexers in the multiplexer array;
   wherein the swizzle mechanism enables the first interconnect bus to be coupled to the second interconnect bus without signal crossing.

8. The system of claim 7, wherein the first chip and the second chip are disposed on one side of a printed circuit board.

9. The system of claim 7, wherein the first chip and the second chip are disposed on opposite sides of a printed circuit board.

* * * * *